US006950566B1

(12) United States Patent
Yun et al.

(10) Patent No.: US 6,950,566 B1
(45) Date of Patent: Sep. 27, 2005

(54) METHOD AND APPARATUS FOR AN ACOUSTO-OPTIC FILTER THAT GENERATES A HELICAL WAVE AND METHOD FOR MANUFACTURING SAME

(75) Inventors: Seok-Hyun Yun, Santa Clara, CA (US); Hyo-Sang Kim, Taejon (KR); In-Kag Hwang, Taejon (KR); Wayne Victor Sorin, Mountain View, CA (US); Hee-Yeal Rhy, DaeJeon (KR)

(73) Assignee: Novera Optics, Inc., Palo Alto, CA (US)

( * ) Notice: Subject to any disclaimer, the term of this patent is extended or adjusted under 35 U.S.C. 154(b) by 0 days.

(21) Appl. No.: 10/650,386

(22) Filed: Aug. 27, 2003

(51) Int. Cl.[7] ......................... G02B 1/335; G02B 6/42
(52) U.S. Cl. ..................... 385/7; 385/27; 385/28
(58) Field of Search ........................... 359/305, 308, 359/312, 314, 278, 279, 285–287; 385/1–3, 385/5, 7, 8, 27, 28; 367/155–160

(56) References Cited

U.S. PATENT DOCUMENTS

| | | | | |
|---|---|---|---|---|
| 4,068,191 A | * | 1/1978 | Zemon et al. ................. 385/1 |
| 4,546,459 A | * | 10/1985 | Congdon ..................... 367/155 |
| 4,706,229 A | * | 11/1987 | Congdon ..................... 367/159 |
| 4,828,350 A | | 5/1989 | Kim et al. ..................... 385/28 |
| 4,832,437 A | | 5/1989 | Kim et al. ..................... 385/1 |
| 4,915,468 A | | 4/1990 | Kim et al. ..................... 385/28 |
| 5,007,705 A | | 4/1991 | Morey et al. ................. 385/12 |
| 5,022,732 A | | 6/1991 | Engan et al. ................. 385/28 |
| 5,708,736 A | | 1/1998 | Steinblatt ..................... 385/28 |
| 6,021,237 A | * | 2/2000 | Kim et al. ..................... 385/28 |
| 6,233,379 B1 | | 5/2001 | Kim et al. ..................... 385/28 |
| 6,253,002 B1 | | 6/2001 | Kim et al. ..................... 385/27 |
| 6,266,462 B1 | | 7/2001 | Kim et al. ..................... 385/28 |
| 6,343,165 B1 | | 1/2002 | Kim et al. ..................... 385/28 |
| 6,510,261 B2 | | 1/2003 | Sorin et al. ................... 385/27 |
| 6,539,148 B1 | | 3/2003 | Kim et al. ..................... 385/27 |
| 6,631,224 B2 | | 10/2003 | Sorin et al. ................... 385/28 |
| 6,640,027 B2 | | 10/2003 | Kim et al. ..................... 385/28 |
| 2002/0003915 A1 | * | 1/2002 | Sorin et al. ................... 385/7 |

OTHER PUBLICATIONS

B.Y. Kim, J. N. Blake, H.E. Engan, and H.J. Shaw, "Acousto-Optic Frequency-Shifting in Two-Mode Optical Fibers," OFS '86, Tokyo, Japan (Oct. 8-10, 1986).

H.E. Engan, B.Y. Kim, J.N. Blake, and H.J. Shaw, "Propagation and optical interaction of guided acoustic waves in two-mode optical fibers," Journal of Lightwave Technology, vol. 6, No. 3, pp. 428-436 (Mar. 1988).

(Continued)

Primary Examiner—Georgia Epps
Assistant Examiner—M. Hasan
(74) Attorney, Agent, or Firm—Blakely, Sokoloff, Taylor & Zafman LLP

(57) ABSTRACT

A method to reduce optical intensity modulation is described that involves generating a spiraling wave onto an acoustic-optic interaction portion of an optical fiber within an acousto-optic filter in order to create reflected waves that are orthogonal with respect to waves that are originally launched onto the interaction portion. A transducer is described having a first section and a second section. The first and second sections each have a polling direction along a first axis. The transducer also has a third section and a fourth section. The third and fourth sections each have a polling direction along a second axis. The third and fourth sections are each between the first and second sections. An acousto-optic filter having a horn with an elliptical cross section coupled to a transducer is also described. A transducer for an excitation element capable of launching spiraling acoustic waves is described.

26 Claims, 14 Drawing Sheets

OTHER PUBLICATIONS

H.E. Engan, D. Ostling, P.O. Kval, and J.O. Askautrud, "Wideband Operation of Horns for Excitation of Acoustic Modes in Optical Fibers," Proc. OFS (10), Glasgow, Scotland, Oct. 11-13, 1994, pp. 568-571 (SPIE Proc. 2360).

D. Ostling and H.E. Engan, "Narrow-Band Acousto-Optic Tunable Filtering in a Two-Mode Fiber," Optics Letters, vol. 20, No. 11, pp. 1247-1249 (Jun. 1, 1995).

H.E. Engan, "Analysis of Polarization Mode Coupling by Acoustic Torsional Waves in Optical Fibers," J. Opt. Soc. Am. A., vol. 13, No. 1, pp. 112-118 (Jan. 1996).

H.E. Engan, "Acoustic Torsional Waves used for Coupling Between Optical Polarization Modes in Optical Fibers," 1996 IEEE Ultrasonics Symposium, pp. 799-802.

D. Ostling and H.E. Engan, "Acousto-Optic Tunable Filters in Two-Mode Filters," Optical Fiber Technology, vol. 3, pp. 177-183 (1997).

W.P. Risk, G.S. Kino, and H.J. Shaw, "Fiber-Optic Frequency Shifter Using a Surface Acoustic Wave Incident at an Oblique Angle," Optics Letters, vol. 11, No. 2, pp. 115-117 (Feb. 1986).

W.P. Risk and G.S. Kino, "Acousto-Optic Fiber-Optic Frequency Shifter Using Periodic Contact with a Copropagating Surface Acoustic Wave," Optics Letters, vol. 11, No. 5, pp. 336-338 (May 1986).

B.Y. Blake, et al., "Fiber-Optic Modal Coupler using Periodic Microbending," Optics Letters, vol. 11, No. 3, pp. 177-179 (Mar. 1986).

B.Y. Kim, et al., "All-Fiber Acousto-Optic Frequency Shifter," Optics Letters, vol. 11, No. 6, pp. 389-391 (Jun. 1986).

W.V. Sorin, et al., "Highly Selective Evanescent Modal Filter for Two-Mode Optical Fibers," Optics Letters, vol. 11, No. 9, pp. 581-583 (Sep. 1986).

B.Y. Kim, et al., "Use of Highly Elliptical Core Fibers for Two-Mode Fiber Devices," Optics Letters, vol. 12, No. 9, pp. 729-731 (Sep. 1987).

H.E. Engan, et al., "Propagation and Optical Interaction of Guided Acoustic Waves in Two-Mode Optical Fibers," IEEE Journal of Lightwave Technology, vol. 6, No. 3, pp. 428-436 (Mar. 1988).

S.H. Yun, et al., "All-fiber Tunable Filter and Laser Based on Two-Mode Fiber," Optics Letters, vol. 21, No. 1, pp. 27-29 (Jan. 1996).

H.S. Kim, et al., "All-Fiber Acousto-Optic Tunable Notch Filter with Electronically Controllable Spectral Profile," Optic Letters, vol. 22, No. 19, pp. 1476-1478 (Oct. 1, 1997).

S.Y. Huang, et al., "Mode-Characteristics of Highly Elliptical Two-Mode Fibers under Purterbations," OFS '88, New Orleans, Louisiana, pp. 14-17, (Jan. 27-29, 1988).

S.H. Yun, et al., "All-Fiber Acousto-Optic Tunable Filter," OFC '95, San Diego, California, pp. 186-187 (Feb. 26-Mar. 3, 1995).

B.Y. Kim, et al., "Fiber Based Acousto-Optic Filters," OFC/IOOC '99, San Diego, California, USA, pp. 199-201, Invited Paper (Feb. 21-26, 1999).

B.Y. Kim, "Acousto-Optic Components for WDM Application," IEEE/LEOS Summer Topical Meetings, San Diego, California, USA, pp. 47-48, Invited Papers (Jul. 26-28, 1999).

B.Y. Kim, "Acousto-Optic Filters for Fiber Systems," ICO-128, San Francisco, California, USA, pp. 92-93, Invited Paper (Aug. 2-6, 1999).

H.S. Kim, S.H. Yun, I.K. Hwang, and B.Y. Kim, "Single-Mode-Fiber Acousto-Optic Tunable Notch Filter with Variable Spectral Profile," Conference on Optical Fiber Communications, 1997 OSA Technical Digest Series, vol. 6, pp. 395-398 (Feb. 16-21, 1997).

* cited by examiner

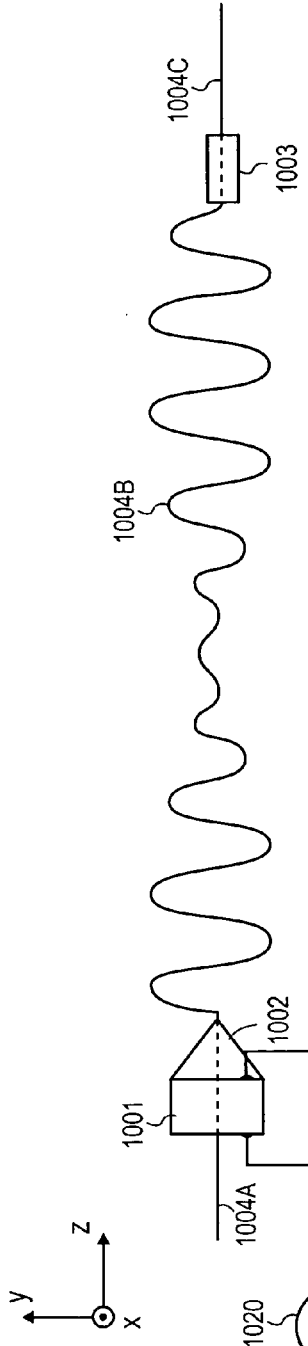
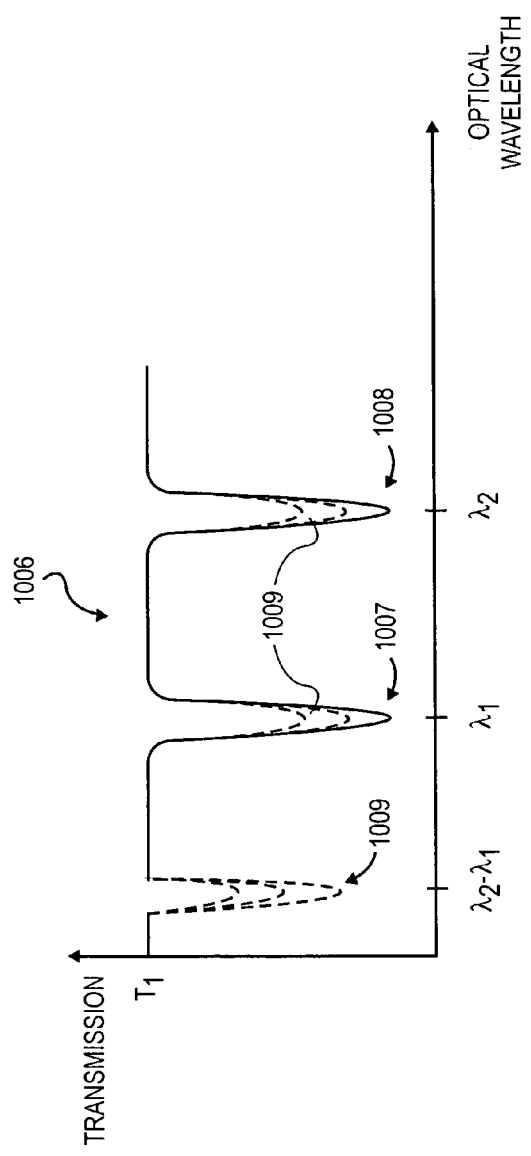
FIG. 10A (PRIOR ART)
FIG. 10B (PRIOR ART)

US 6,950,566 B1

METHOD AND APPARATUS FOR AN ACOUSTO-OPTIC FILTER THAT GENERATES A HELICAL WAVE AND METHOD FOR MANUFACTURING SAME

FIELD OF INVENTION

The Field of Invention relates to networking technology, generally; and, more specifically, to a method and apparatus for an acousto-optic filter that generates a helical wave; and, a method for manufacturing the same.

BACKGROUND

A. Overview of An Exemplary Acousto-Optic Filter

Wavelength division multiplexing technology (e.g., Wavelength Division Multiplexing (WDM), Dense Wavelength Division Multiplexing (DWDM), etc.) involves the launching of a plurality of communication signals over a single optical fiber, wherein, each communication signal has its own associated optical wavelength. As such, the signal processing associated with wavelength division multiplexing technology involves the ability to process a particular communication signal at its own associated optical wavelength (or optical wavelength range).

An acousto-optic filter is a type of filter that can be "tuned" so as to filter the optical passband of an optical fiber at a specific optical wavelength. Thus, for example, an acousto-optic filter can be used to filter a single WDM/DWDM communication signal from a group of WDM/DWDM communication signals that exist on the same optical fiber. That is, the passage of optical energy being carried by the optical fiber at a specific optical wavelength (or a specific optical wavelength range) is attenuated. As a result, the strength of one or more communication signals that fall within the range of the filtered optical wavelength(s) is reduced. Reducing the strength of a communication signal can be useful if the signal is part of an overall equalization scheme.

An acousto-optic filter includes an excitation element that launches an acoustic wave along an optical fiber. The acoustic wave affects the optical properties of the optical fiber so that the optical signal strength(s) that reside at specific optical wavelength(s) is (are) attenuated. FIG. 1a shows an example of an acousto-optic filter. A continuous optical fiber is shown in FIG. 1a as having at least three sections 104a, 104b and 104c. A first section 104a of the optical fiber effectively acts as the input node to the filter; and, a third section 104c of the optical fiber effectively acts as the output node from the filter. A second section 104b of the optical fiber (which may also be referred to as the "acousto-optic interaction" section), as seen in FIG. 1a, is the section of the fiber that propagates an acoustic wave.

A transducing ring 101 that is made of piezo-electric material (e.g., PbZrT (PZT), PbMnN, etc.) and a horn 102 (which is often made of Aluminum (Al) or glass or other metals or ceramics) can be integrated together to form an excitation element that launches the acoustic wave onto the second optical fiber section 104b. A damper 103 absorbs acoustic wave energy so that the fiber section 104c that acts as the filter output may be kept physically rigid.

As a result of the activity of the excitation element, as seen in FIG. 1a, an acoustic wave is formed on the acousto-optic interaction fiber section 104b that propagates in the +z direction. The acoustic wave has a wavelength $\lambda_f$ and an amplitude B. The wavelength $\lambda_f$ and the amplitude B of the acoustic wave are a function of the properties of the transducing ring 101, the properties of the horn 102 and the amplitude and frequency of an electronic signal that is provided to the transducing ring 101 by an electronic signal source 105 (e.g., a voltage signal source) as briefly described immediately below.

In the exemplary embodiment of FIG. 1a, the electronic signal that is provided by the electronic signal source 105 has been expressed as $A\cos(2\pi f_s t)$. By positioning the leads that carry the electronic signal across the thickness "T" of the transducing ring 101, the electronic signal will induce a time-varying electric field across the transducing ring 101 (e.g., along the z axis as drawn in FIG. 1a). The transducing ring 101, being made of piezo-electric material, will "vibrate" in response. The direction of the vibrational response depends upon the "polling direction" of the transducing ring.

A polling direction is a property of piezo-electric material that indicates along which direction a piezo-electric stress can be induced. For example, if transducing ring 101 of FIG. 1a has its polling direction set along the y axis, the transducing ring 101 will vibrate along the y axis. That is, the dimension of the transducing ring 101 along the y axis will change with time. For example, in response to an oscillating electric field of frequency $f_s$ along the z axis, the transducing ring's height dimension "H", as drawn in FIG. 1a, will oscillate (also at a frequency of $f_s$) between some minimum height and some maximum height.

The amplitude of the transducing ring's stress is a function of the amplitude of the applied electric field; which, in turn, is a function of the amplitude "A" of the electronic signal $A\cos(2\pi f_s t)$. As such, according to the exemplary embodiment of FIG. 1a, the electronic signal determines both the frequency and the amplitude of the stress experienced by the transducing ring 101. The transducing ring 101 described just above can be referred to as a "shear mode" transducing ring because its polling direction is perpendicular to the direction of the applied electric field. Other transducing ring embodiments may have alternate polling directions (such as a thickness mode transducing ring having a thickness that varies with time).

The horn 102, as a result of its conical shape, amplifies the transducing ring's vibration and propagates it onto the acousto-optic interaction optical fiber section 104b. As an example of this amplification, the tip of the cone 120 can be made to vibrate with an amplitude of 100.0 nm and a frequency of $f_s$ if the cone 102 has an acoustic gain of $10^3$ and the transducing ring 101 and electronic signal combine to produce a 0.1 nm transducing ring 101 stress that oscillates at a frequency of $f_s$.

This vibration is then transferred to the acousto-optic interaction fiber section 104b at the tip of the cone 120 (which causes the fiber to propagate an acoustic wave of approximately the same amplitude and frequency in the +z direction). The wavelength $\lambda_f$ of the acoustic wave is a function of its velocity "v" and its frequency $f_s$ (i.e, $\lambda_f = v/f_s$, where the velocity "v" is a function of the material composition of the optical fiber and its surrounding medium (such as a vacuum)). As discussed above, the amplitude of the acoustic wave B is a function of the amplitude A of the electronic signal. FIG. 1b shows an exemplary optical transfer function 106 for the acousto-optic filter that results from the acousto-optic wave observed in FIG. 1a.

According to the transfer function 106 of FIG. 1b, the wavelength $\lambda_f$ of the acoustic wave of FIG. 1a determines which optical frequency $\lambda_o$ is filtered; and, the amplitude B of the acoustic wave of FIG. 1a determines the extent 107 to which the optical frequency $\lambda_o$ is attenuated. Better said, according to the transfer function 106 of FIG. 1*b*, optical frequencies other than $\lambda_o$ are more easily passed through the acousto-optic interaction portion of the optical fiber 104*b* with a relatively high transmission of T1.

However, optical frequencies at or near $\lambda_o$ (as represented by point 107 in FIG. 1*b*) are passed along the acousto-optic interaction section 104*b* of the optical fiber with a relatively low transmission of T2 (which corresponds to high attenuation). By varying the frequency $f_s$ of the electronic signal provided to the transducing ring 101, the attenuation frequency $\lambda_o$ can be made to vary; and, by varying the amplitude of the electronic signal A, the extent of the optical attenuation can be made to vary. Thus, by controlling the frequency $f_s$ and amplitude A of the electrical signal, the optical transfer function 106 of an acousto-optic filter can be "tuned" so as to prescribe a particular attenuation for a particular optical wavelength.

B. Reflections in Acousto-Optic Filters

A problem with acousto-optic filters is the presence of acoustic reflections that propagate along the acousto-optic interaction portion 104*b* of the optical fiber. As is known in the art, a change in the transportation medium of a wave induces a reflection of that wave. Thus, when an acoustic wave traveling in the +z direction along the acousto-optic interaction portion 104*b* of the fiber impinges upon the damper 103, a reflected wave is induced along the acousto-optic interaction portion 104*b* that travels in the –z direction. A portion of this reflected wave may then be reflected in the +z direction at the tip 120 of the cone 102.

Those of ordinary skill will recognize that the above described phenomena will cause "interaction" between the originally launched and reflected waves suitable for the establishment of a "standing wave" or "beating" on the second optical fiber portion 104*b*. Beating of the second harmonic type corresponds to amplitude fluctuation over time. An exemplary depiction of an acoustic-optic wave as it experiences beating of the second harmonic type is shown in FIG. 2*a*. Note that the acoustic wave is drawn as having: 1) a first amplitude at a first moment in time t1 (with solid line 204*b*1); and 2) a second amplitude at a second moment in time t2 (with dashed line 204*b*2). Consistent with the dynamics of acousto-optic filtering as discussed in the preceding section, a variation in acoustic wave amplitude, which also corresponds to time varying acousto-optic wave energy, will result in time varying attenuation through the filter for signals having wavelength $\lambda_O$.

The variation in attenuation, which may also be referred to as optical intensity modulation, is observed in the transfer function 206 of FIG. 2*b* by a pair of profiles: 1) a first (solid) profile 207 having greater attenuation (e.g., as associated with solid acoustic wave 204*b*1 of FIG. 2*a*); and 2) a second (dashed) profile 209 having lesser attenuation (e.g., as associated with dashed acoustic wave 204*b*2 of FIG. 2*b*). This fluctuation in attenuation corresponds to inconsistent filtering and thus can lead to inconsistent signal processing of wavelength division multiplexed signals.

FIGURES

The present invention is illustrated by way of example, and not limitation, in the Figures of the accompanying drawings in which:

FIG. 1*a* shows an exemplary embodiment of an acousto-optic filter. FIG. 1*b* shows an exemplary embodiment of the optical transfer function of the acousto-optic filter of FIG. 1*a*.

FIG. 2*a* shows an exemplary embodiment of an acousto-optic filter that is experiencing a standing acousto-optic wave.

FIG. 2*b* shows an exemplary embodiment of the optical transfer function of the acousto-optic filter of FIG. 2*a*.

FIG. 3*a* shows an embodiment of a pair of orthogonal wave components;

FIG. 3*b* shows a resultant helical wave from the combination of the pair of orthogonal wave components of FIG. 3*a*;

FIG. 4*a* shows a first embodiment of a transducing ring that can create a helical acoustic wave.

FIG. 4*b* shows a second embodiment of a transducing ring that can create a helical acoustic wave FIG. 5 shows an embodiment of a circuit that may be configured with the transducing ring embodiment of FIG. 4*a* in order to generate a helical acoustic wave.

FIG. 6 shows an embodiment of a circuit that may be configured with the transducing ring embodiment of FIG. 4*b* in order to generate a helical acoustic wave.

FIGS. 7*a* and 7*b* relate to an embodiment of a method that may be used to fabricate the transducing ring embodiment that is observed in FIG. 4*a*.

FIGS. 10A and 10B relate to a prior art technique for filtering a discrete pair of optical wavelengths along a single acousto-optic interaction optical fiber region.

Figure 11:
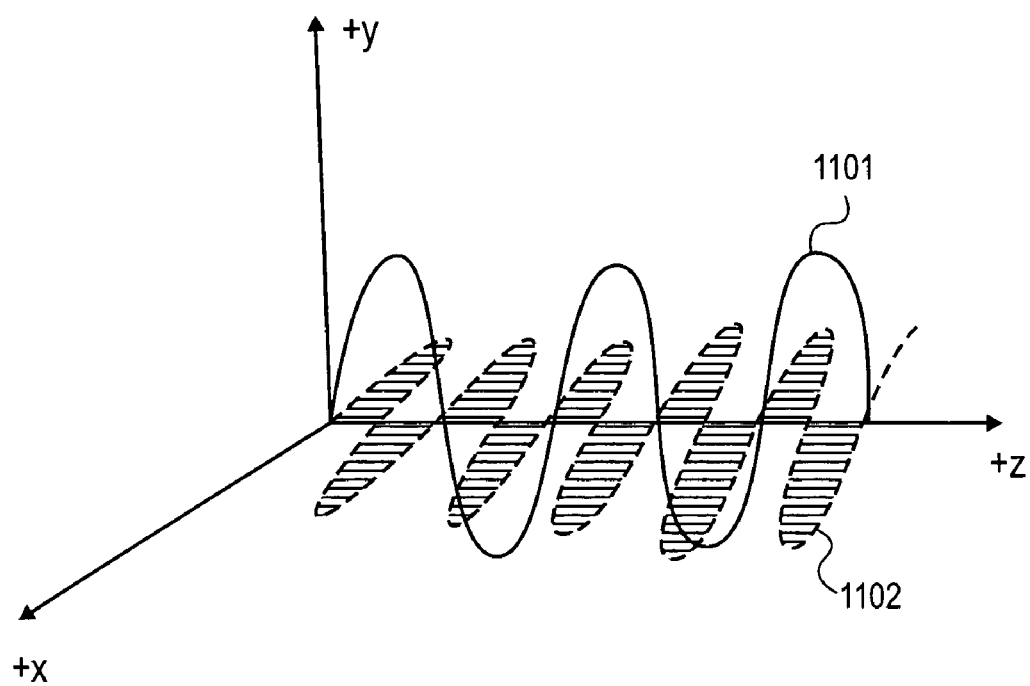

FIG. 11 shows a pair of out of phase orthogonal wave components that possess different frequencies with respect to one another.

Figure 12:
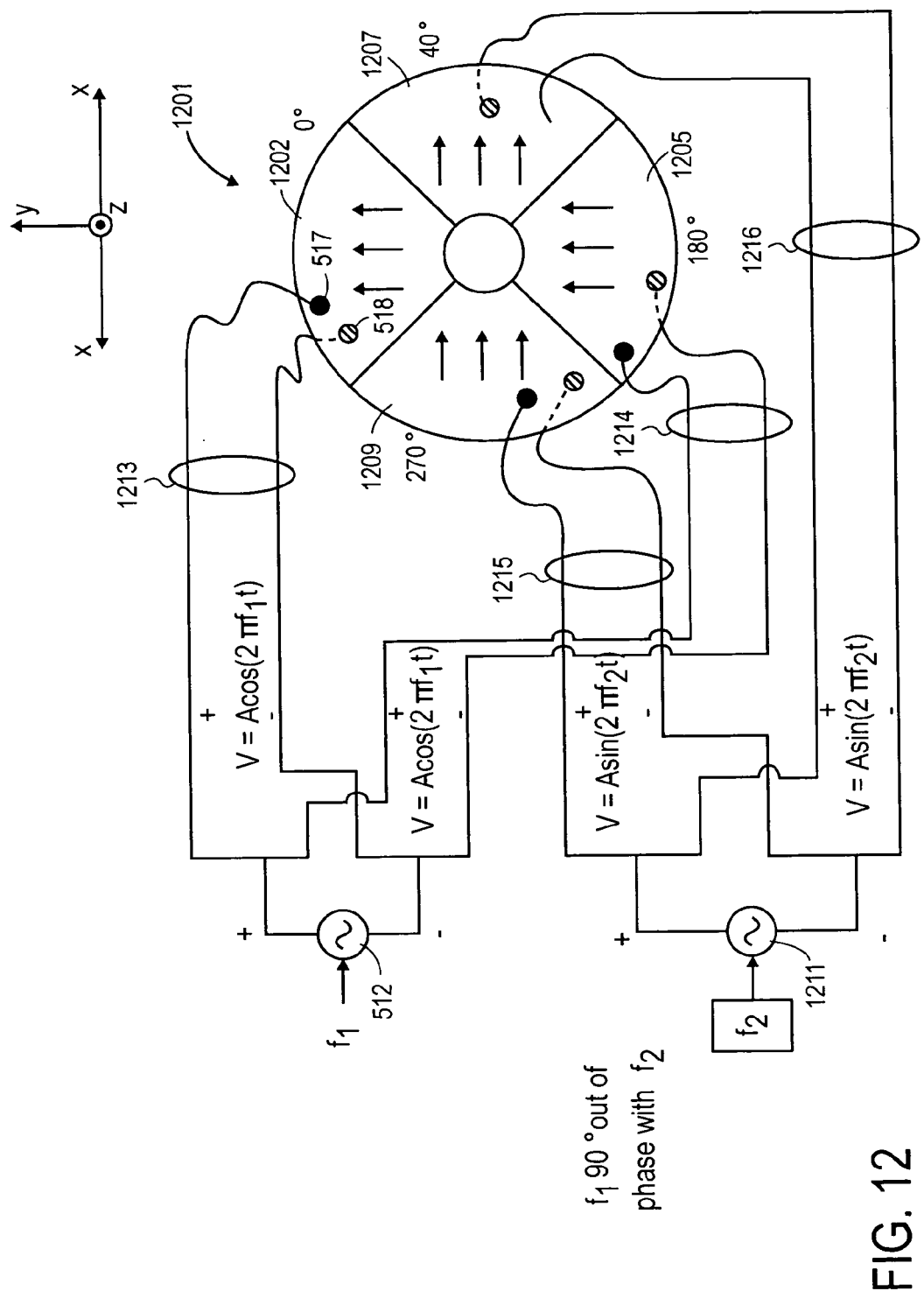

FIG. 12 shows an embodiment of a circuit that can be used to generate a a pair of out of phase orthogonal wave components that possess different frequencies with respect to one another.

Figure 13:
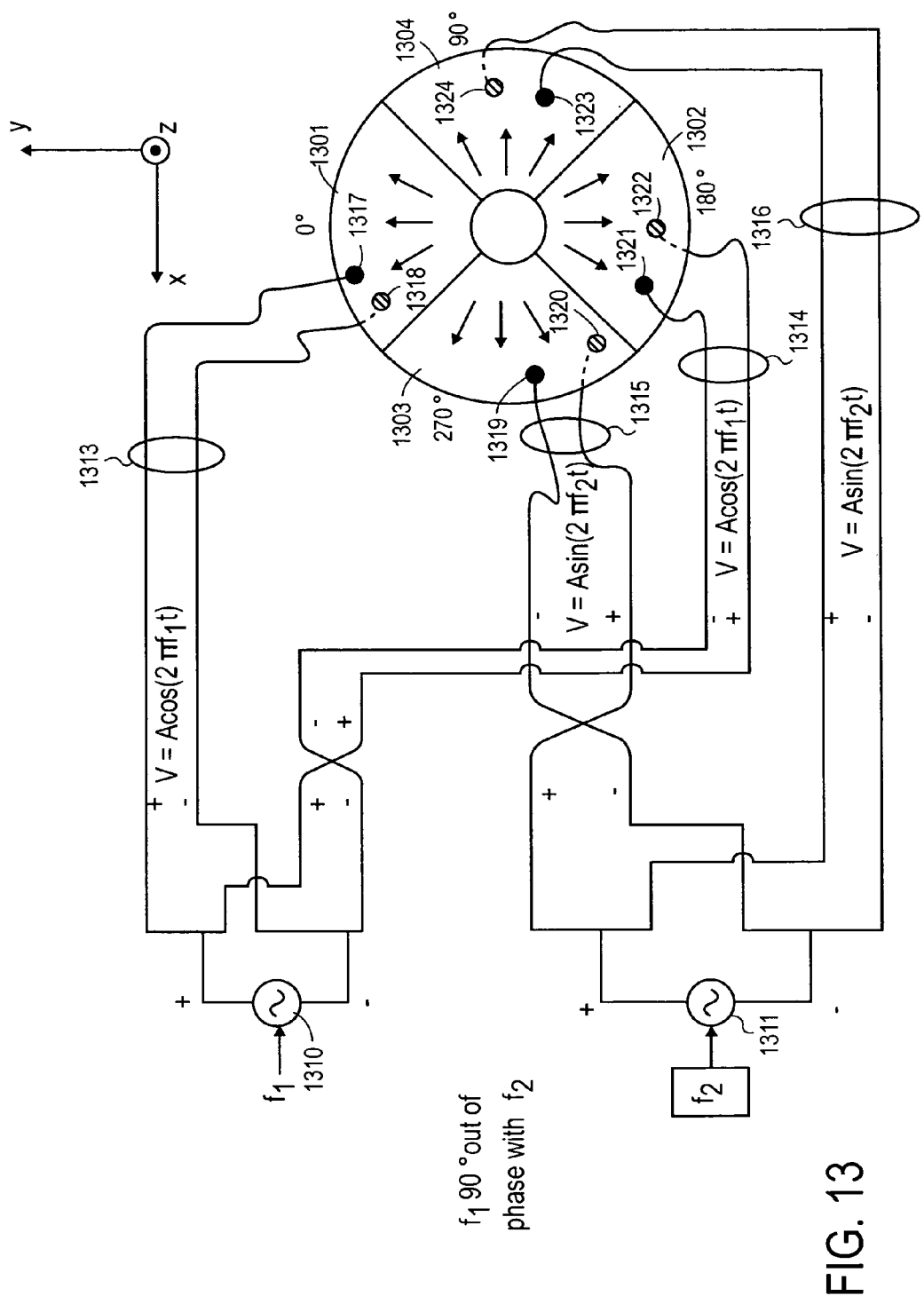

FIG. 13 shows another embodiment of a circuit that can be used to generate a pair of out of phase orthogonal wave components that possess different frequencies with respect to one another.

Figure 14:
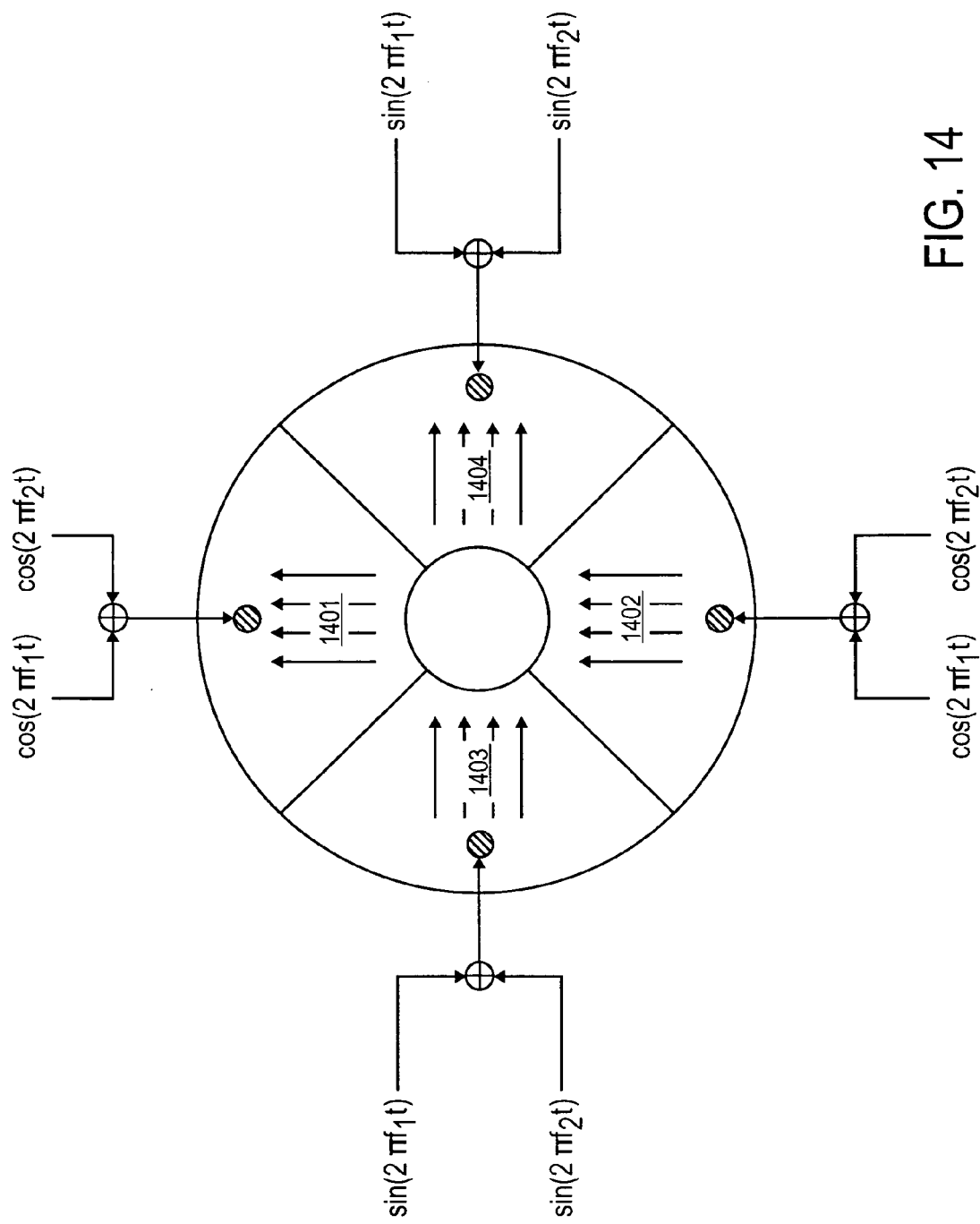

FIG. 14 shows another embodiment of a circuit that can be used to generate a pair of out of phase orthogonal wave components that possess different frequencies with respect to one another.

DETAILED DESCRIPTION

A. Orthogonal Reflected Waves

Figure 2A:
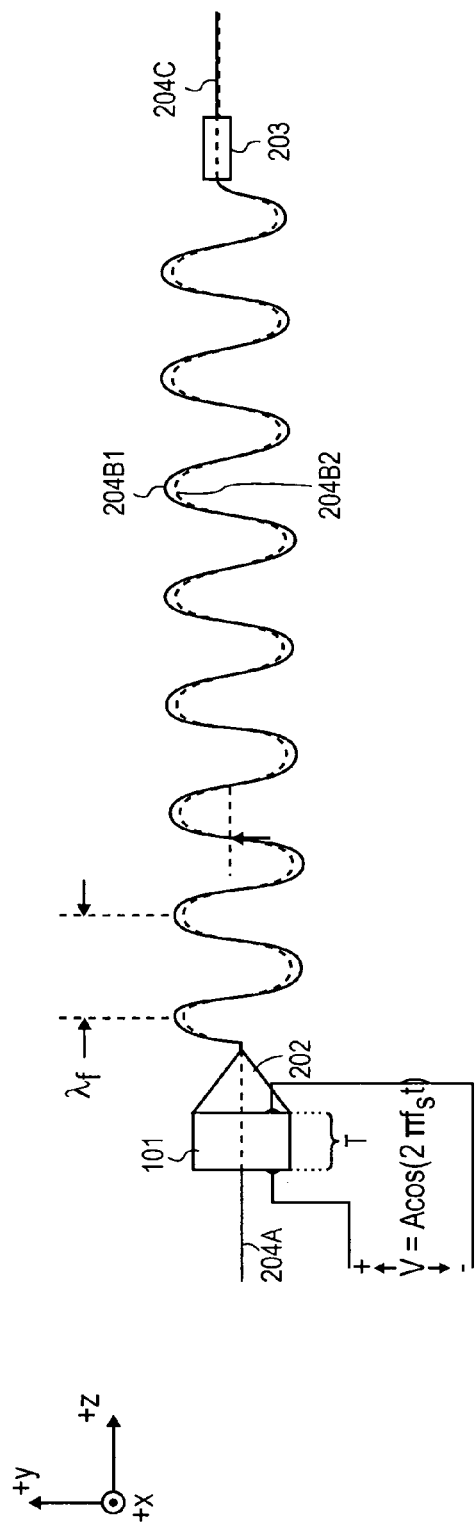
Figure 2B:
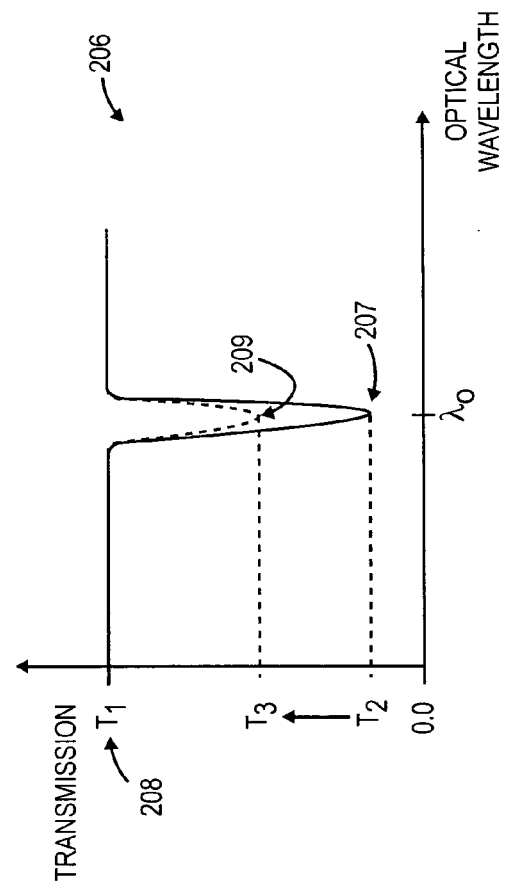

A solution to the attenuation fluctuation problems caused by reflection induced beating in an acousto-optic filter is the creation of a reflected wave that is orthogonal to the originally launched (or "incident") wave. Orthogonal waves are waves that impose little or no interaction effects upon one another. According to a classic example, a first wave is oriented perpendicular to a second wave so that the pair of waves can not interact. Referring to FIG. 2*a*, the originally launched wave (i.e., the wave "emitted" at the tip of the horn 202) projects its amplitude along the y axis as it travels in the +z direction. Accordingly, the originally launched wave may be said to be oriented along the y axis.

According to prior art acousto-optic filter designs, the nature of the originally launched wave and the damper 203 causes the reflected wave to be oriented identically to the originally launched wave. Therefore, according to the example presented in FIG. 2a, the reflected wave is likewise oriented along the y axis as it travels in the −z direction. As a consequence of the reflected and originally launched wave activities being identically oriented, the reflected wave directly interferes with the originally launched wave. This direct interference causes the second harmonic distortion and amplitude fluctuation discussed in the background.

A solution therefore involves the creation of a reflected wave whose orientation is orthogonal to that of the originally launched wave. Orthogonal orientation between the reflected wave and the originally launched wave will prevent the reflected wave from interfering with the originally launched wave. As a consequence, second harmonic induced amplitude fluctuation is eliminated; which, in turn, prevents inconsistent filtering through the acousto-optic filter.

Orthogonal reflected wave energy can be purposely induced by launching spiraling wave energy onto the fiber of an acousto-optic filter (e.g., so as to exhibit right-handed or clockwise spiraling motion, left-handed or counter-clockwise spiraling motion, etc.). That is, an acousto-optic filter having an excitation element tailored to launch a spiraling wave onto the fiber will exhibit significantly reduced second harmonic amplitude fluctuations as compared to prior art acousto-optic filters; which, by contrast, have excitation elements geared toward orienting wave energy along a single axis (noting that spiraling wave energy can typically be broken down into a pair of axis as described in more detail below). "Spiraling" wave energy is either perfect or imperfect. A perfect spiral is referred to as a "helical wave". An imperfect spiral is referred to as an "elliptical wave".

A helical acoustic wave or an elliptical acoustic wave can be viewed as a wave having a pair of orthogonal wave components that are out of phase with respect to one another. In the case of the helical wave, however, the amplitudes of the orthogonal wave components are equal and the wave components are 90° out of phase with respect to one another. By contrast, in the case of an elliptical acoustic wave, the amplitudes of the orthogonal wave components are unequal and/or the wave components are not 90° out of phase with respect to one another.

Figure 3A:
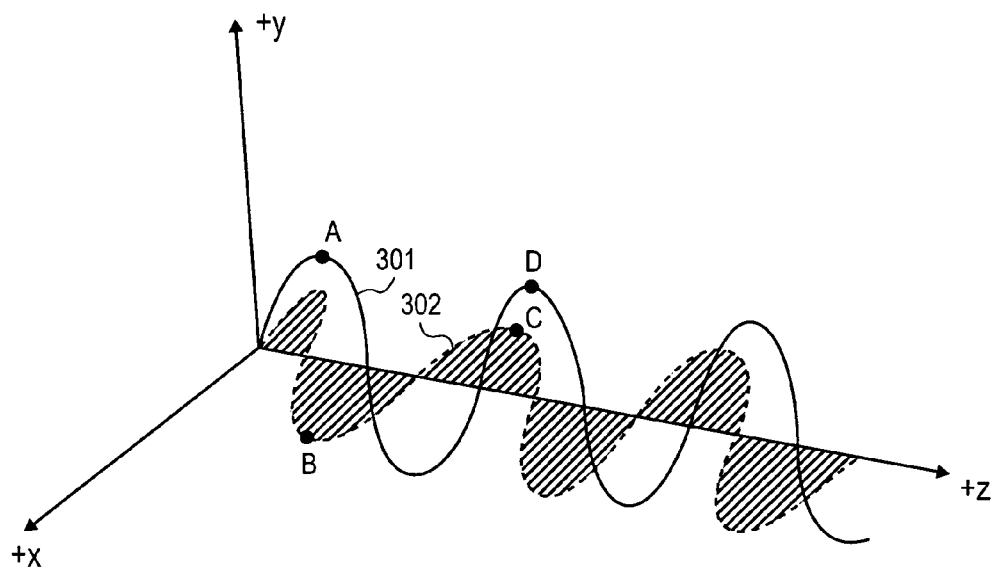
Figure 3B:
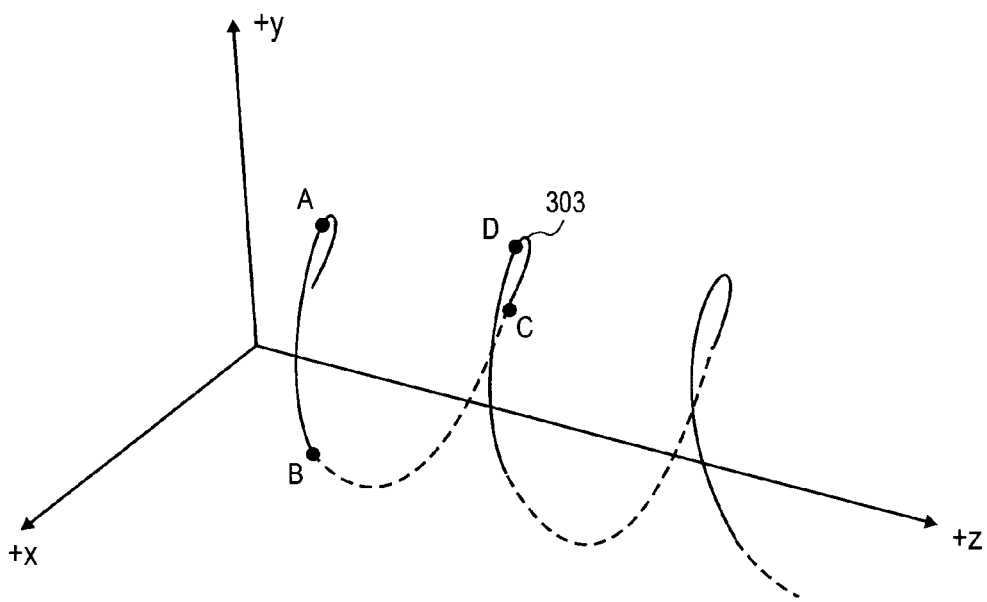

FIG. 3a shows a helical wave. Note that a pair of orthogonal wave components 301, 302 having equal amplitude and that have a 90° phase offset are depicted. FIG. 3b shows a depiction of an acousto-optic interaction portion of an optical fiber that has been excited with wave energy that corresponds to the pair of orthogonal wave components 301, 302 observed in FIG. 3a. If one where to observe the situation of FIG. 3b directly down the z axis in the −z direction, the fiber would outline a circle laying in the xy plane. Note that FIG. 3a may be viewed as: 1) a first wave component 301 that lies in the yz plane; and, 2) a second wave component 302 that lies in the xz plane that is also out of phase with the first wave component 301 by 90°.

Note that points A, B, C and D of FIGS. 3a and 3b have been drawn so that the manner in which a helix can be made to naturally result from a pair of orthogonal 90° out of phase wave energy components can be more easily depicted. For further ease comprehension, the portion of the helical wave 303 of FIG. 3b that falls beneath the xz plane has been drawn as dashed (rather than solid). The phase difference can be achieved by designing the excitation element to induce wave energy along the yz plane that is 90° out of phase with wave energy that is also directed by the excitation element along the xz plane.

Because of their orthogonal orientation and phase relationship with respect to one another, and because of the nature of reflected wave dynamics, the ill effects of intensity modulation from the reflected wave energy is compensated for. In a sense, the reflected energy from a first component (e.g., component 301) can be viewed as orthogonal reflected energy to the second component (e.g., component 302) which results in no interference to the second component. Likewise, the reflected energy from the second component (e.g., component 302) can be viewed as orthogonal reflected energy with the first component (e.g., component 301) which results in no interference with the first component.

In the case of an elliptical acoustic wave, the amplitudes of the orthogonal wave components are unequal and/or the wave components are not 90° out of phase with respect to one another. Elliptical acoustic waves may be deliberately launched by an excitation element where the damper region is known to exhibit asymmetrical reflection. For example, if a helical wave (perfect spiral) is launched onto the fiber and the damper causes asymmetrical reflection (e.g., one component is less reflected than another component), imperfect orthogonal reflections are created resulting in amplitude fluctuations on the light.

In order to compensate for asymmetrical reflecting activity, an elliptical wave having an asymmetry that accounts for the reflecting asymmetry may be launched onto the fiber. By compensating for the asymmetric reflection in this manner, second harmonic wave interference and its resulting acoustic wave amplitude fluctuation can be eliminated or at least substantially reduced. For example, referring briefly to FIG. 3a, if wave component 301 is known to be less reflected (e.g, percentage-wise) by the damper than wave component 302, wave component 301 may be purposely created by the excitation element to have an amplitude that is greater than wave component 302; where, the difference "makes up for" the reflection asymmetry.

By so doing, the reflection of component 301 can still be viewed as being an orthogonal reflection of component 302; and, the reflection of component 302 can still be viewed as an orthogonal reflection of component 301. Similar compensation can be undertaken with respect to phase. For example, if the reflection at the damper is known to impart 2° of phase lead from component 301 to component 302, an elliptical wave may be formed having a phase difference that corresponds to 88° of phase lead from component 301 to component 302.

Imparting a spiraling wave onto an optical fiber may be accomplished through various approaches which may be loosely organized according to "Transducing Techniques" and "Mechanical Techniques". Also, the characteristics of a spiralling wave naturally lends itself to "Multiple Frequency Filtering Techniques". Some embodiments for each of these is discussed in the sub-sections that follow below. Each of these sub-sections has been uniquely titled as provided just above.

B. Transducing Techniques

Figure 4A:
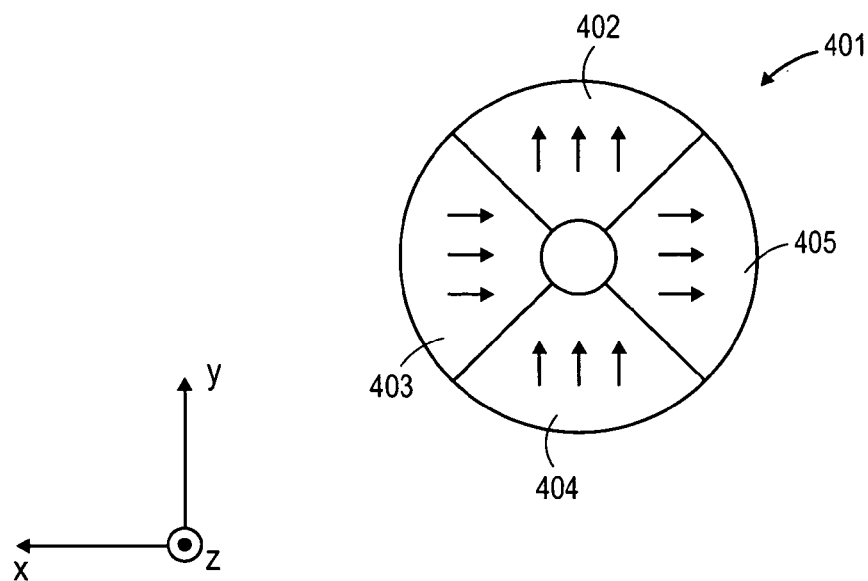
Figure 4B:
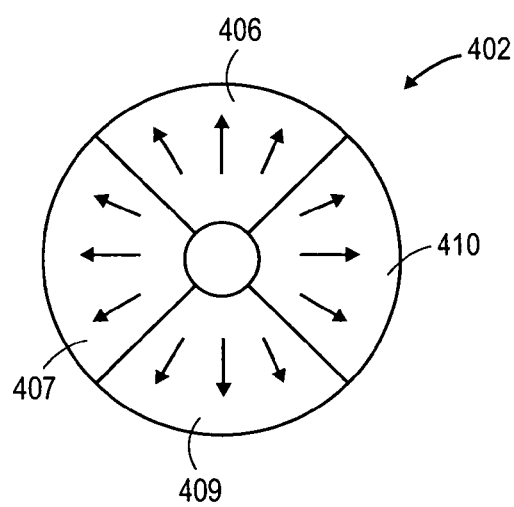

FIGS. 4a and 4b each show an example of a transducing ring 401, 402 that can generate a spiraling wave. As a spiraling wave can be viewed as having a pair of orthogonal wave components that are out of phase with respect to one another, each of the transducing ring embodiments 401, 402 of FIGS. 4a and 4b may be viewed as being tailored to produce a first wave component that lies in the xz plane and a second wave component that lies in the yz plane.

Although not a strict design requirement of the transducing rings 401, 402 of FIGS. 4a and 4b, it may be helpful to view each of the transducing rings 401, 402 as being partitioned into separate sections so that a pair of orthogonal wave components can be constructed. For example, the transducing ring 401 embodiment of FIG. 4a can be viewed as partitioned into four separate sections 402, 403, 404, and 405. Similarly, the transducing ring embodiment 402 of FIG. 4b can be viewed as being partitioned into four separate sections 406, 407, 408, and 409. The separate sections 402 through 409 may viewed as being "partitioned" so that each can support an electrical field that is different than the electric field sustained in a neighboring section.

That is, for example, section 402 can support an electric field that is different than an electric field appearing in section 403 or 405; section 406 can support an electric field that is different than an electric field appearing in section 407 or 410;, etc. Because each transducing ring section 402 through 409 can receive its own unique electric field (at least with respect to its neighboring ring sections), different electronic signals can be applied to the same transducing ring.

The application of different electronic signals to neighboring ring sections (in light of the polling direction of each of the ring sections) allows the transducing ring embodiments 401, 402 of FIGS. 4a and 4b to generate different acoustic wave components so that a spiraling wave will be generated onto the optical fiber. A description of some exemplary configurations immediately follow. However, before continuing, it is important to point out that the transducing ring embodiments of FIGS. 4a and 4b need not be physically or actually partitioned as alluded to above.

That is, transducer rings may be fabricated so as to be of a continuous nature wherein different electric fields are simply applied to different ring regions, and; the different electric field flux paths that result from the different applied electric fields are resolved naturally and continuously within the transducer ring. As such, rather than having physical sections with uniform electric fields and abrupt electric field changes when crossing over a section boundary (i.e., the physically partitioned case), embodiments may exist having sections with non-uniform electric fields and gradual electric field changes when crossing over a section boundary (i.e., the continuous case). Furthermore, transducer shapes other than just rings may be employed (e.g., squares, rectangles, ovals, etc.). As such, the generic term "transducer" may be used to encompass a transducer of any shape suitable for an acousto-optic filter. For illustrative simplicity, however, the following examples refer mostly to transducing rings.

For simplicity, the following description reads as though the transducer rings have been physically partitioned such that the electrical fields behave uniformly within each section. However, the above points should be kept in mind; and, as a result, one of ordinary skill will recognize that the electrical configurations described below will successfully operate if applied to rings of a continuous construction.

Figure 5:
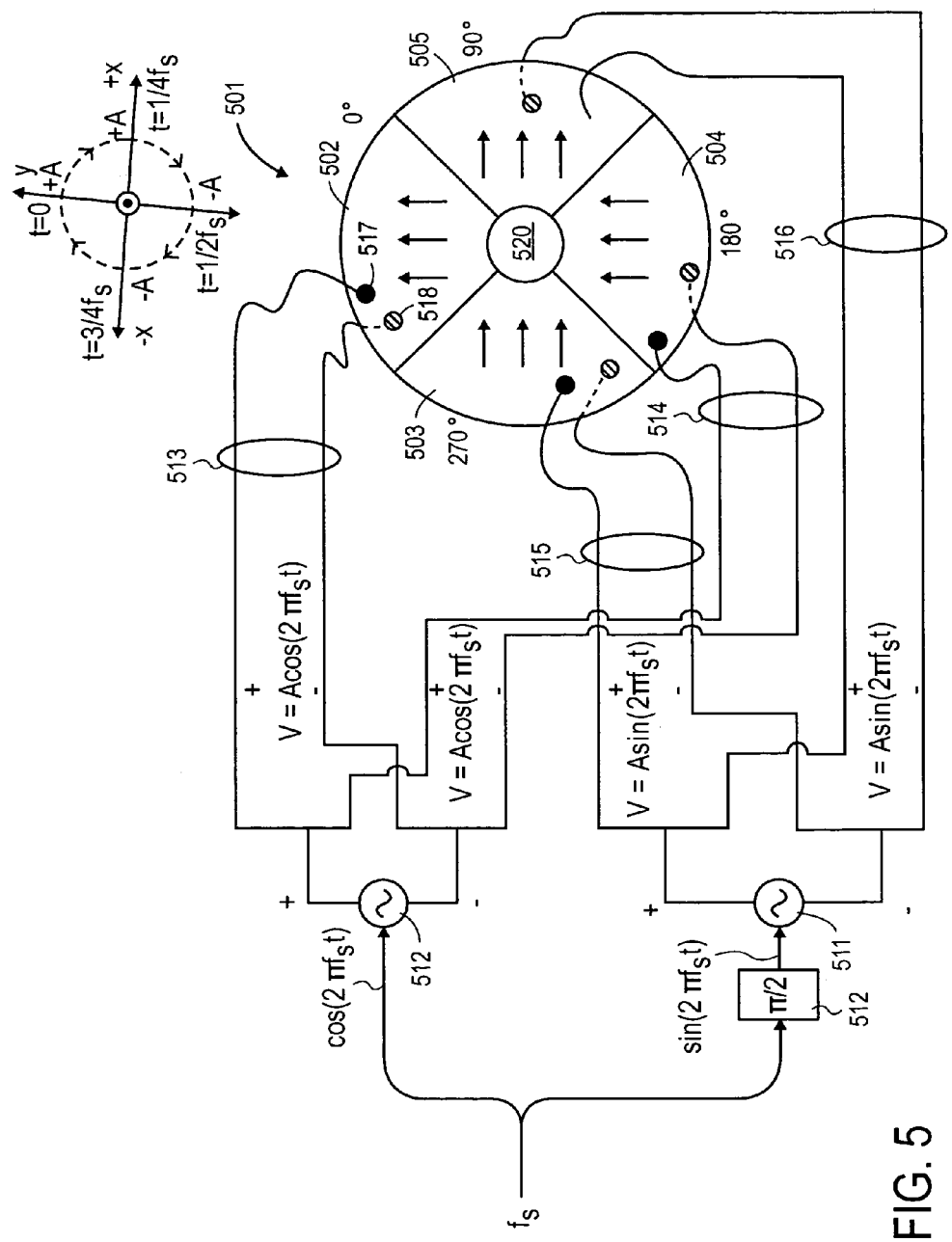

FIG. 5 shows an electronic signaling embodiment that may be configured with the transducing ring embodiment of FIG. 4a in order to generate a pair of orthogonal acoustic wave components that are separated in phase by 90°. That is, transducing ring sections 502 through 504 of transducing ring 501 of FIG. 5 may be viewed as corresponding to transducing ring sections 402 through 404, respectively, of FIG. 4a.

Figure 1A:
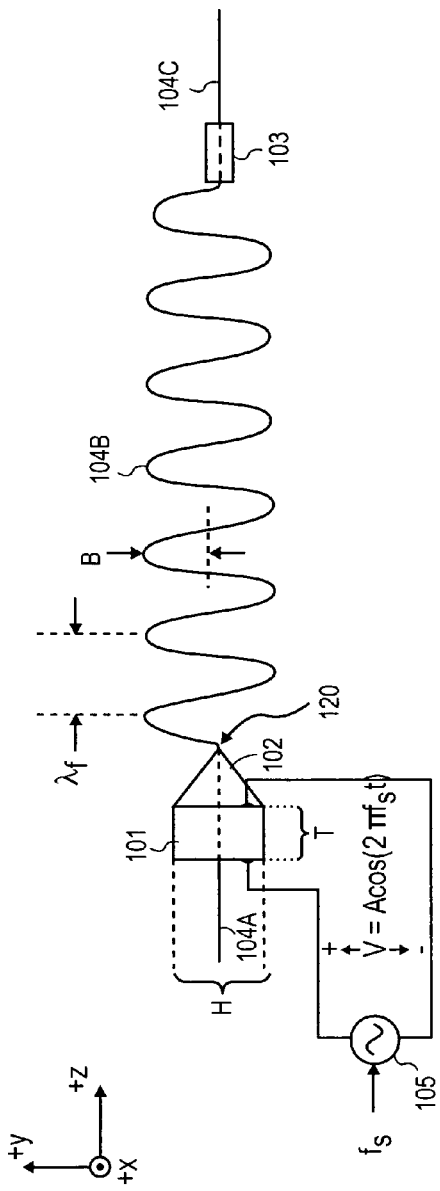
Figure 1B:
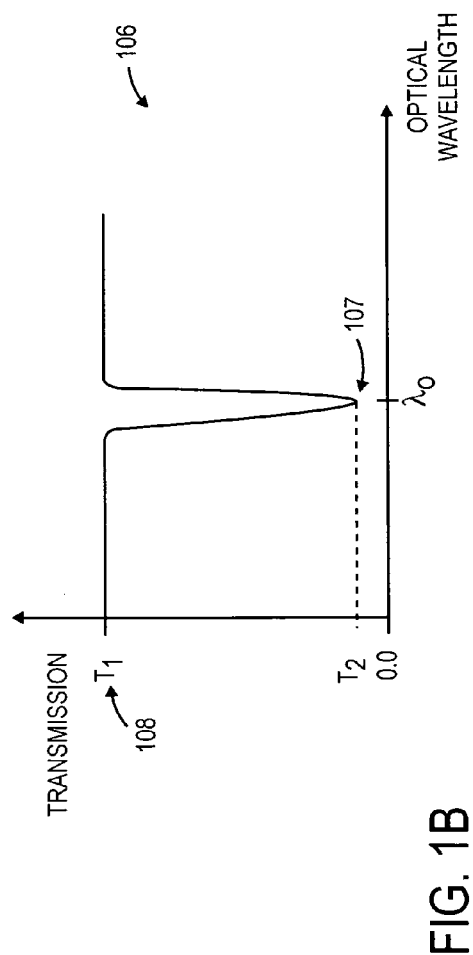

Before continuing, as a preliminary point of reference, note the xyz coordinate system of FIG. 5 preserves the xyz coordinate system of FIGS. 3a and 3b. In each of these figures, the acoustic wave propagates along the z axis along the +z direction. Referring to FIG. 5, note that the center hole 520 of the transducing ring 501 allows for the insertion of the optical fiber which helps to define the region of the optical fiber that acts as the input node of an acousto-optic filter (similar to the first section 104a of optical fiber observed of FIG. 1a).

Referring to the electrical wiring embodiment of FIG. 5, note that a first and third sections 502, 504 of the transducing ring 501 receive a first electronic signal $A\cos(2\pi f_s t)$ (that is generated by a first electronic signal source 510) and a second and fourth sections 503, 505 of the transducing ring 501 receive a second electronic signal $A\sin(2\pi f_s t)$ (that is generated by a second electronic signal source 511). The second electrical signal is crafted from the first electrical signal via a phase delay unit 512 that imposes a 90° phase delay.

Note that the polling directions of the first and third sections 502, 504 of the transducing ring 501 point along the y axis; and, the second and fourth sections 503, 505 of the transducing ring 501 point along the x axis. As the y axis and the x axis are orthogonal to each other, the first and third transducing ring sections 502, 504 are used to form a first wave component that lies in the yz plane; and, the second and fourth sections 503, 505 are used to form a second wave component that lies in the xz plane.

Furthermore, as the cosine and sine functions that describe the electric signal being applied respectively to ring sections 502, 504 and 503, 505 have a phase difference of 90°, the first wave component described above will be out of phase with the second wave component by 90°. As such, if the electric signal sources 510, 511 create signals of identical amplitude "A", a helical wave (e.g., as depicted in FIG. 3b) should be created by an ideal transducing ring 501 because the electric signals used to generate the orthogonal components are of equal amplitude and are 90° out of phase. More details are provided immediately below.

Note that in the embodiment of FIG. 5 the positively leaded terminals (e.g., terminal 517) for the electronic signals are coupled to the face of the transducing ring 501 that points in the −z direction; and that, the negatively leaded terminals (e.g., terminal 518) for the electronic signals are coupled to the face of the transducing ring 501 that points in the −z direction. As a result, when the first electronic signal reaches an amplitude of +A (e.g., at time t=0), the first wave component will reach a maximum amplitude in the +y direction because the polling direction of the first and third sections 502, 504 point in the +y direction and the electric field points in the +z direction.

Similarly, when the first electronic signal reaches an amplitude of −A (e.g., at time $t=\frac{1}{2}f_s$), the first wave component will reach a maximum amplitude in the −y direction because the polling direction of the first and third sections 502, 504 point in the +y direction and the electric field points in the −z direction. By comparison, when the second electronic signal reaches an amplitude of +A (e.g., at time $t=\frac{1}{4}f_s$), the second wave component will reach a maximum amplitude in the +x direction because the polling direction of the second and fourth sections 503, 505 point in the +x direction and the electric field points in the +z direction.

Also, when the second electronic signal reaches an amplitude of −A (e.g., at time $t=\frac{3}{4}f_s$), the second wave component will reach a maximum amplitude in the −x direction because the polling direction of the second and fourth sections 503, 505 point in the +x direction and the electric field points in the −z direction. A quick review of the timing associated with the description above indicates that the stress experienced by the transducing ring in response to the electronic signals tends to "rotate" in a clockwise direction.

That is, as drawn on the xyz coordinate system of FIG. 5, at time t= 0 the stress extends in the +y direction, at time t=¼$f_s$ the stress extends in the +x direction, at time t=½$f_s$ the stress extends in the −y direction, and at time t= ¾$f_s$ the stress extends in the −x direction. This rotational transducing activity causes the horn tip to rotate around the z axis in a clockwise direction and, similar to the activity of a crank, generates a spiraling wave onto the optical fiber. In order to generate the appropriate electrical fields, lead pairs 513 and 514 effectively provide the first electronic signal Acos(2π$f_s$t) across transducer ring sections 502 and 504, respectively; and, lead pairs 515 and 516 effectively provide the second electronic signal Asin(2π$f_s$t) across transducer ring sections 503 and 505, respectively.

Note that the approach of FIG. 5 is designed such that transducer ring sections that are driven by a common electrical source (e.g., such as ring sections 502 and 504 which are both driven by electrical source 510) have their polling directions pointing in approximately the same direction (e.g., such as ring sections 502 and 504 whose polling directions both point in the +y direction). As such, each group of ring sections that help establish a wave component along a particular plane (e.g., such as ring sections 502 and 504 which help establish a wave component within the yz plane) receive the same electrical signal (e.g., Acos(2π$f_s$t)).

An elliptical wave could be launched onto the fiber simply by: 1) imparting a difference between the amplitude of the electric signal provided by source 510 and the amplitude of the electric signal provided by source 511; and/or, 2) imparting a phase difference other than 90° by phase delay unit 512. For example, if source 510 is configured to induce an amplitude of "A" and source 511 is configured to induce an amplitude of "B" (so that the signals labeled "Asin(2π$f_s$t)" in FIG. 5 were changed to read "Bsin(2π$f_s$t)") the maximum electric field strength created across ring sections 504, 517 would be different than the maximum electric field strength created across ring sections 503, 505; which, in turn, would produce unequal corresponding wave component amplitudes on the optical fiber. If the difference in amplitude were deliberately imposed to compensate for asymmetrical reflection, second harmonic interference and the corresponding acoustic wave amplitude fluctuation may be eliminated or at least substantially reduced.

Figure 6:
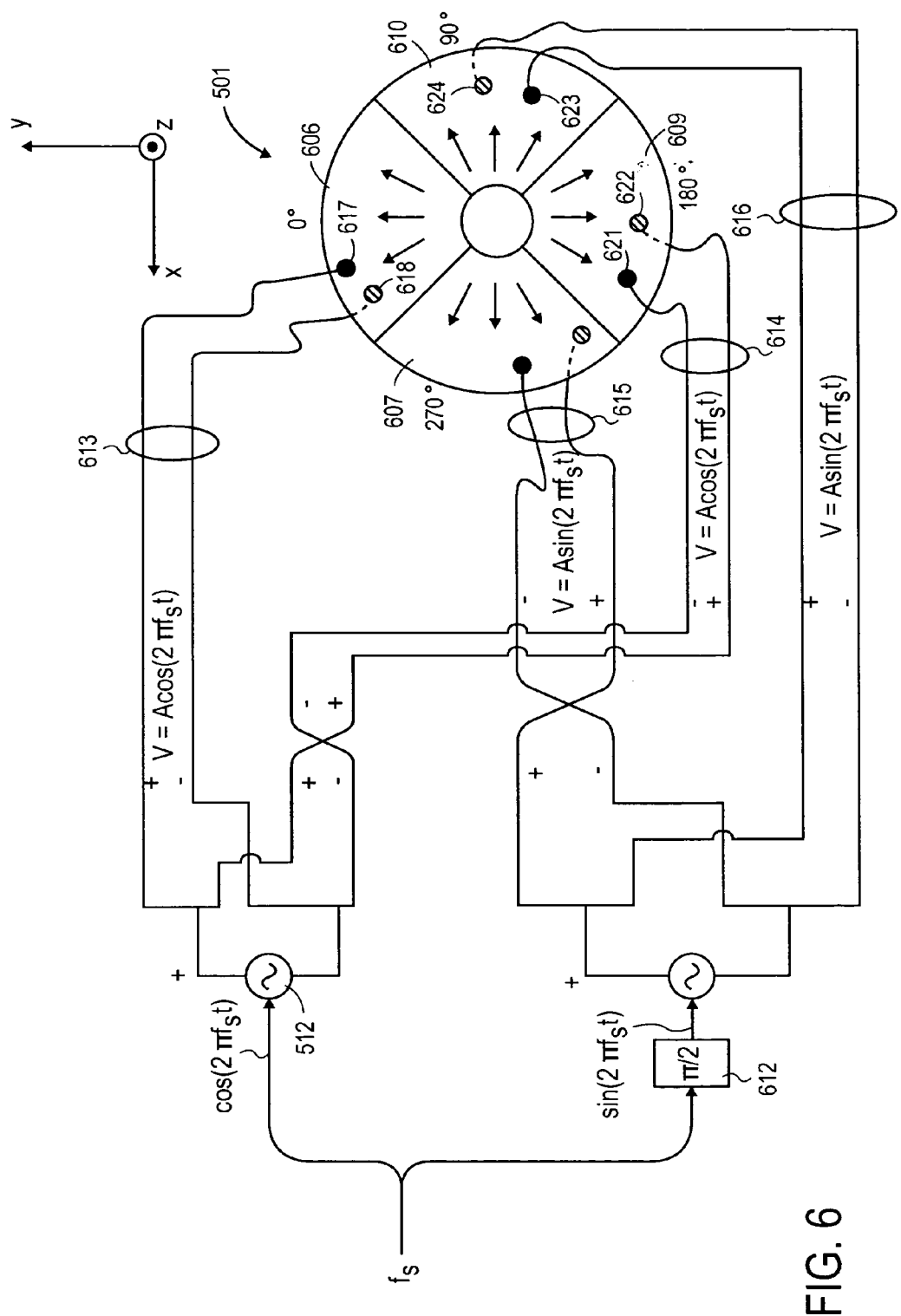

FIGS. 4b and 6 relate to an alternate approach than that observed in FIGS. 4a and 5. FIG. 6 shows an embodiment of the electronic signaling that may be configured with the transducing ring embodiment of FIG. 4b. Thus, the transducer ring 601 sections 606 through 609 of FIG. 6 may be viewed as corresponding to the transducer ring sections 406 through 409 of FIG. 4. Here similar to the approach of FIGS. 4a and 5, transducer ring sections 606 and 608 help establish an acoustic wave component that lies approximately in the yz plane and transducer ring sections 607 and 609 help establish an acoustic wave component that lies approximately in the xz plane.

Referring to FIG. 6, the polling directions of the transducer ring 601 sections 606 through 609 and the polarity of the lead connections 617 through 624 are configured such that the stress induced to the transducer ring rotates in a clockwise direction (e.g., as discussed just above with respect to FIG. 4). Thus, the acoustic wave component that lies in the yz plane is approximately 90° out of phase with respect to the acoustic wave component that lies in the xz plane.

Note, however, that the approach of FIG. 6 is designed such that transducer ring sections that are driven by a common electrical source (e.g., such as ring sections 606 and 608 which are both driven by electrical source 610) have their polling directions pointing in approximately opposite directions (e.g., such as ring section 606 whose polling directions point within +/−45° of the +y direction; and, ring section 608 whose polling directions point within +/−45° of the −y direction). As such, each group of ring sections that help establish a wave component along a particular plane (e.g., such as ring sections 606 and 608 which help establish a wave component within the yz plane) receive electrical signals that are 180° out of phase with one another.

For example, as seen in FIG. 6, note that transducer ring section 606 receives an electrical signal of Acos(2π$f_s$t) while transducer ring section 608 receives an electrical signal of −Acos(2π$f_s$t). For similar reasons, transducer ring section 607 receives an electrical signal of Asin(2π$f_s$t) while transducer ring section 609 receives an electrical signal of −Asin(2π$f_s$t). As a result, when the first electronic signal Acos(2π$f_s$t) reaches an amplitude of +A (e.g., at time t=0), the first wave component will reach a maximum amplitude in the +y direction because the polling direction(s) of the first section 606 have a +y direction while its electric field points in the +z direction and because the polling direction(s) of the third section 608 have a −y direction while its electric field points in the −z direction.

Similarly, when the first electronic signal reaches an amplitude of −A (e.g., at time t=½$f_s$), the first wave component will reach a maximum amplitude in the −y direction because the polling direction(s) of the first section 606 have a +y direction while its electric field points in the −z direction and because the polling direction(s) of the third section 608 have a −y direction while its electric field points in the +z direction. Also, when the second electronic signal Asin(2π$f_s$t) reaches an amplitude of +A (e.g., at time t=¼$f_s$), the second wave component will reach a maximum amplitude in the +x direction because the polling direction(s) of the fourth section 609 have a +x direction and its electric field points in the +z direction and because the polling direction(s) of the second section 607 have a −x direction and its electric field points in the −z direction.

Finally, when the second electronic signal Asin(2π$f_s$t) reaches an amplitude of −A (e.g., at time t=¾$f_s$), the second wave component will reach a maximum amplitude in the −x direction because the polling direction(s) of the fourth section 609 have a +x direction and its electric field points in the −z direction and because the polling direction(s) of the second section 607 have a −x direction and its electric field points in the +z direction. Thus, a quick review of the timing associated with the description above indicates that the stress experienced by the transducing ring in response to the electronic signals tends to "rotate" in a clockwise direction as drawn on the xyz coordinate system of FIG. 5.

Again, deliberate differences between electric signal amplitude and/or phase can be imposed to create an elliptical rather than helical wave. Moreover, "in situ" calibration techniques may be employed (e.g., on a manufacturing floor) to repeatedly monitor and adjust signal amplitude and/or phase so as to create desired spiraling wave energy. For example, as alluded to above, an initially elliptical spiraling wave (e.g., resulting from "ideal" applied electrical signals but less than ideal transducer and horn transfer electrical-to-mechanical characteristics) may be repeatedly monitored and the applied electrical signals may be repeatedly adjusted, in response to specific instances of monitored wave characteristics, so that the spiraling wave energy begins to approach a more helical motion. Calibration of the applied electronic signals may also attempt to compensate for non-ideal reflection characteristics in order to promote orthogonality as between the originally launched and reflected waves.

Figure 7A:
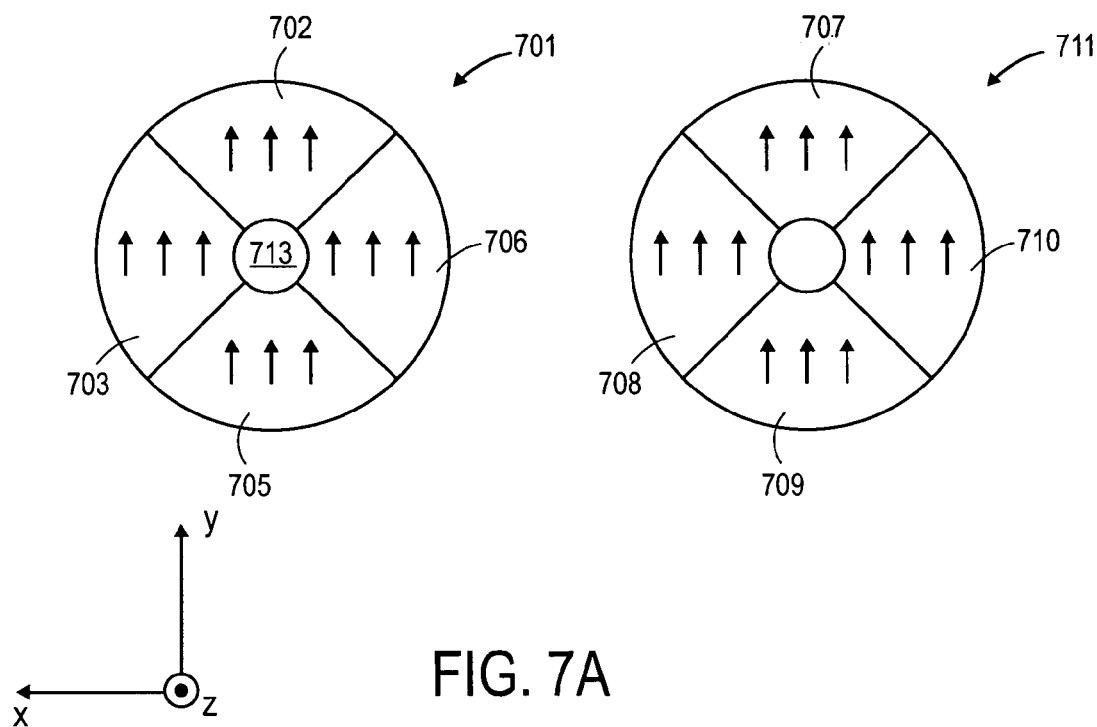
Figure 7B:
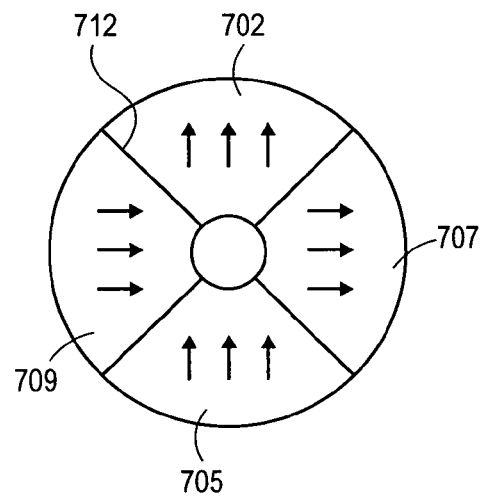

One of ordinary skill will appreciate that a transducing ring having a radial polling direction as seen in FIGS. 4b and 6 can be constructed in a continuous fashion (i.e., the separate ring sections are not individually pieced together to form the ring). FIGS. 7a and 7b, however, relate to a methodology that may be used to construct a physically sectioned transducing ring embodiment that conforms to the transducing ring design observed in FIGS. 4a and 5. Referring to FIG. 7a, a pair of continuous transducing rings 701, 711 are formed having approximately uniform polling direction (e.g., along the +y direction as seen in FIG. 5a).

Each of these rings may be "broken" or otherwise physically divided into sections. For example, as seen in FIG. 7a, ring 701 may be physically divided into separate sections 702, 703, 705, 706 and ring 711 may be physically divided into sections 707, 708, 709, and 710. After the rings have been physically divided into separate sections, specific sections are pieced together to form the transducer ring observed in FIG. 7b. Specifically, those sections having a polling direction that runs approximately from the inner edge of the ring to the outer edge of the ring (such as ring sections 702 of ring 701 and ring section 707 of ring 711); and, those sections having a polling direction that runs approximately from the outer edge of the ring to the inner edge of the ring (such as ring section 705 of ring 701 and ring section 709 of ring 711). The above described sections 702, 707, 705, and 709 may then be pieced together, as shown in FIG. 7b, to form the desired ring structure.

C. Mechanical Techniques

The above sub-section discussed transducing techniques that could be used to generate a helical acoustic wave. The present sub-section describes mechanical designs that may be used to generate or help generate a spiraling acoustic wave. Here, the dimensions of a specific acousto-optic filter component (e.g., the excitation element) is tailored so that helical or elliptical acousto-optic waves are naturally shaped on the acousto-optic interaction portion of the filter's optical fiber. An embodiment for a horn is shown in FIG. 8.

Figure 8:
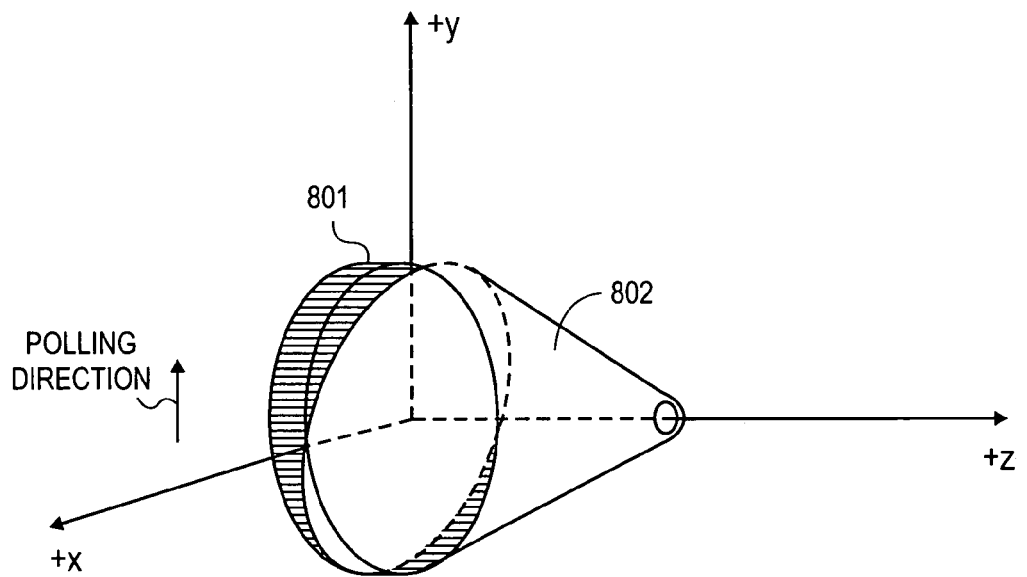
FIG. 8 shows an embodiment of traditional shear mode transducing ring coupled to an elliptical horn that can be used to generate a helical acoustic wave.
Figure 8:
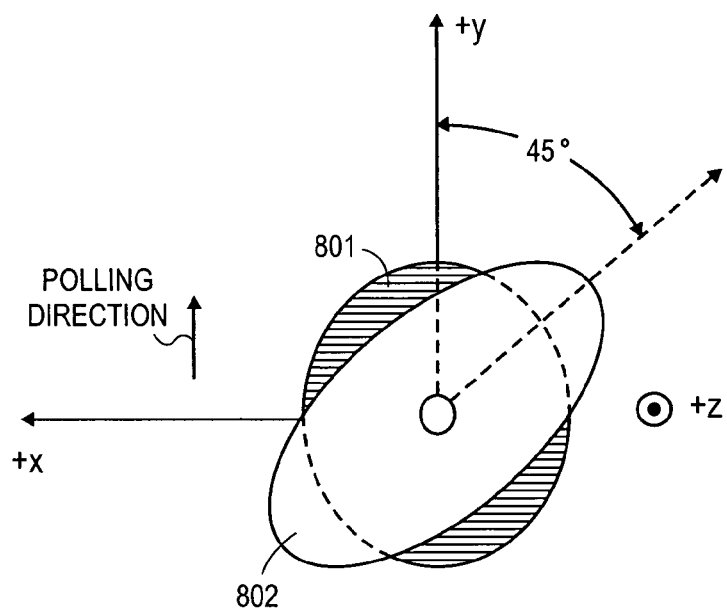

FIG. 8 shows an embodiment of an elliptical horn 802 structure that is coupled to a traditional shear mode transuding ring 801. The horn 802 is used to amplify the stress experienced by the transducing ring 801 so that a sufficiently large helical acoustic wave is transferred to the acosuto-optic interaction portion of an optical fiber. Because of the horn's elliptical cross section and 45° orientation (with respect to the major axis of the horn's ellipse and the polling direction of the transducing ring 801 as observed in FIG. 8), a spiraling wave (e.g., that preserves the perspective of FIG. 3b with respect to the xyz coordinate system of FIG. 8) will be naturally formed onto the acusto-optical interaction region of an optical fiber.

That is, wave energy is applied along both the x axis and y axis as drawn in FIG. 8. Furthermore, again because of the elliptical horn and its orientation, the wave component that travels along the xz plane is 90° out of phase with the wave component that travels along the yz plane. Note that a traditional shear mode transducing ring 801 (e.g., having a uni-directional polling direction along the y axis as drawn in FIG. 8) can be used in combination with the elliptical horn to generate the spiraling acoustic wave.

Figure 9:
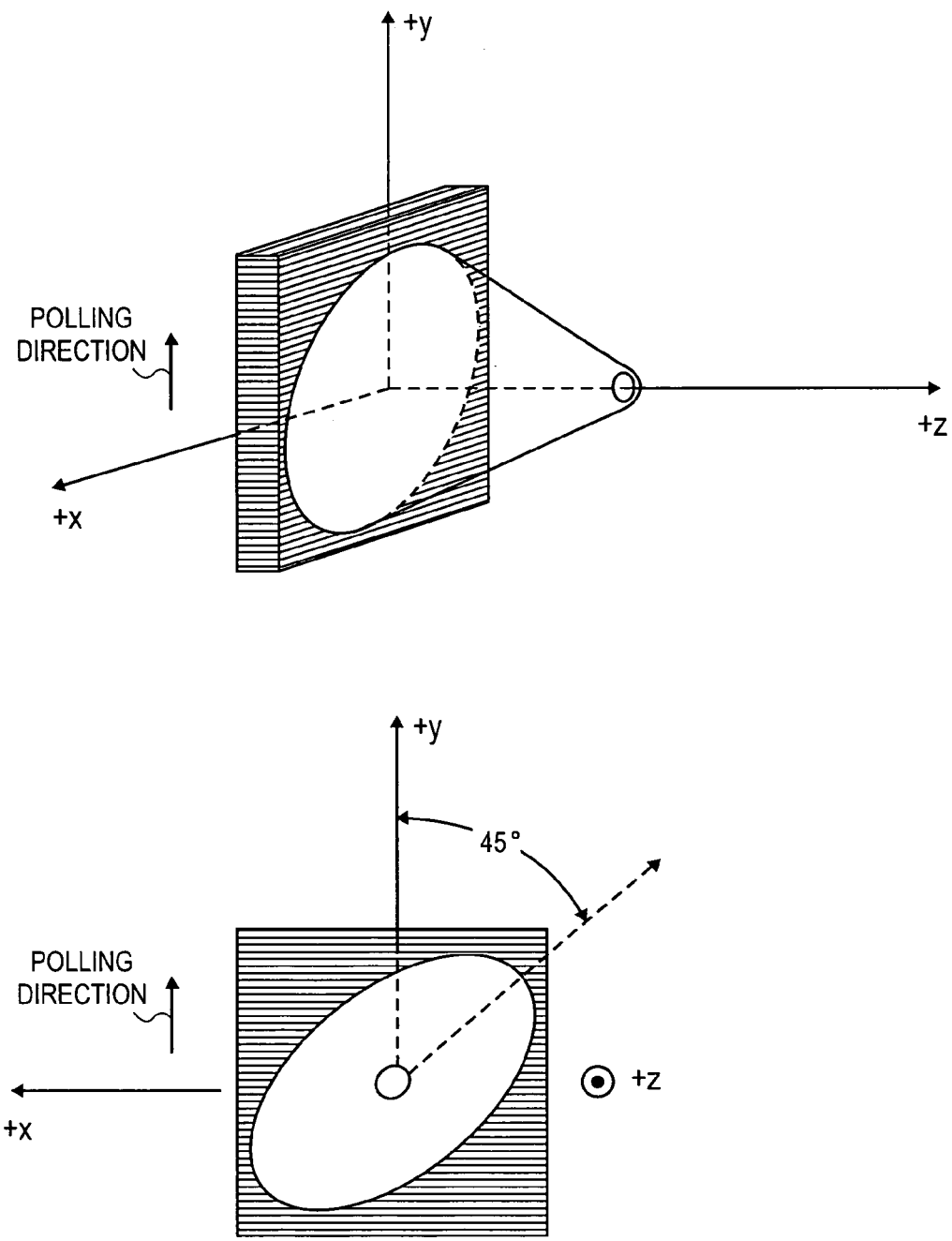
FIG. 9 shows an embodiment of traditional shear mode transducing square coupled to an elliptical horn that can be used to generate a helical acoustic wave.

Note that other transducer shapes (e.g., squares, rectangles, etc.) could be used instead of a ring. FIG. 9 shows an embodiment of the horn observed in FIG. 8 coupled to a square transducer rather than a ring shaped transducer (as originally observed in FIG. 8).

D. Multiple Frequency Filtering Techniques

FIGS. 10a and 10b relate to an embodiment of a prior art approach that has been used to filter a pair of optical wavelengths in an independently tunable fashion. That is, a first frequency f1 is used to filter a first optical wavelength $\lambda_1$; and, a second frequency f2 is used to filter a second optical wavelength $\lambda_2$. Here, a summation unit 1020 is used to add a pair of signals $A\sin(2\pi f_s t)$, $A\sin(2\pi f_s t)$ together so as to form a combined signal $A\sin(2\pi f_s t)+A\sin(2\pi f_2 t)$ that is applied to a traditional (shear mode or thickness mode) transducing ring 1001. Because the frequency f1, f2 of the pair of signals can be made to be independent of one another, in theory, the approach of FIGS. 10a and 10b allows one to independently filter a pair of optical communication signals such as a first optical signal having a first wavelength $\lambda_1$ that is filtered with the first frequency f1; and, a second optical signal having a second wavelength $\lambda_2$ that is filtered with the second frequency f2.

Here, the transfer function 1006 of FIG. 10b demonstrates such an effect. Note that the activity of the transducing ring 1001 in response to the combined signal $A\sin(2\pi f_1 t)+A\sin(2\pi f_2 t)$ can be viewed as resulting in a pair of wave energy components on the acousto-optic interactive region 1004b of the optical fiber. A first having frequency f1 and a second having frequency f2. Unfortunately, due to the nature of interaction dynamics that result from a pair of frequency components which are excited onto a fiber, the pair of wave components interfere with each other (e.g., via "crosstalk") so as to create another frequency component at frequency f2–f1 whose amplitude varies with time. As a result, intensity modulation 1009 is observed in the transfer function 1006 at both of optical wavelengths $\lambda_1$ and $\lambda_2$ that correspond to this induced f2–f1 frequency component.

In theory, the above described inteference can be eliminated if the pair of wave components (i.e., the first at frequency f1 and the second at frequency f2) are orthogonal. FIG. 11 shows an embodiment of a pair of wave components that correspond to such an approach. Here, in contrast to the approach of FIG. 3a, the approach of FIG. 11 deliberately imposes orthogonal wave components having different frequencies. That is, a first wave component 1101 that lies in the yz plane has a first frequency (e.g., f1); and a second wave component that 1101 lies in the xz plane has a second frequency (e.g., f2). As an example, note that f2 =2f1 in the depiction of FIG. 11; however, in practice no relationship between f1 and f2 need exist and the difference between f1 and f2 can be almost any difference within operational reason.

As a transducing ring capable of generating an orthogonal pair of wave components can be used to generate the wave components observed in FIG. 11, the transducing ring embodiments 401, 402 of FIGS. 4a and 4b may be employed. FIGS. 12 and 13 relate to electrical circuit embodiments that can be used with the transducing ring approaches 401, 402 of FIGS. 4a and 4b respectively in order to generate a pair of orthogonal wave components that posses different frequencies with respect to each other.

Here, with respect to each of these Figures, note that a first electronic signal source 1210, 1310 receives a first frequency reference f1; and, a second electronic signal source 1211, 1311 receives a second frequency reference f2. As such, in both of these embodiments, a first wave component that lies in the yz plane will be launched onto the optical fiber with a frequency of f1; and, a second wave component that lies in the xz plane will be launched onto the optical fiber with a frequency of f2.

FIG. 14 shows another embodiment capable of generating a pair of spiraling waves onto the fiber, where a first spiraling wave is created with a first frequency ("f1") and a second spiraling wave is created with a second frequency ("f2") and the pair of spiraling waves are orthogonal with respect to each other. In order to create a spiraling wave with a specific frequency, electrical stimulation at the specific frequency should be applied sufficiently "around" the transuding structure. Therefore, in order to create a pair of spiraling waves where a first spiraling wave is created with a first frequency of f1 and a second spiraling wave is created with a second frequency f2, electrical stimulation at both the f1 and f2 frequencies should be applied sufficiently around the transducer.

Note that the transducing ring embodiment having the applied electrical stimulation observed in FIG. 14 is one possible approach because electrical stimulation having both f1 and f2 frequency components are applied to each of the ring's pieces 1401, 1402, 1403, 1404 (so as to cause electrical stimulation of both f1 and f2 to be applied sufficiently around the ring). Moreover, in order to create a spiraling wave, appropriate phase offsets should be imposed upon electrical stimulation of a same frequency at neighboring locations around the transducer. Again, the applied electrical stimulation observed in FIG. 14 is one possible approach because cosine electrical stimulation is placed between sine electrical stimulation (and, likewise, sine electrical stimulation is between cosine electrical stimulation) when the stimulation applied to neighboring ring pieces are compared around the transducing ring.

Moreover, by incorporating phase offsets of an appropriate sense for a particular spiraling wave, the spiraling wave can be launched onto the fiber having a specific spiraling sense (i.e., clockwise spiral or counter-clockwise spiral). Because of the ease at which electrical stimuli may be crafted, the pair of spiraling waves may be launched together onto the fiber having a same sense (i.e., both clockwise or both counter-clockwise); or, different senses (i.e., a first spiraling wave spirals with a clockwise sense and a second spiraling wave spirals with a counter-clockwise sense). The approach of FIG. 14 corresponds to the later approach because the f1 sine terms are of a positive polarity while the f2 sine terms are of a negative polarity (indicating that the f1 and f2 signal components directed to pieces 1403 and 1404 impart energy of an opposite sense with respect to one another).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to reduce optical intensity modulation, comprising:
    generating a spiraling wave onto an acoustic-optic interaction portion of an optical fiber within an acousto-optic filter in order to create reflected wave components that are orthogonal with respect to wave components that are originally launched onto said interaction portion.

2. The method of claim 1 further wherein said generating further comprises:
    inducing a first stress to a transducer in a first direction with a first signal, said first stress being transformed into a first component of said spiraling wave; and
    inducing a second stress to said transducer in a second direction with a second signal, said second stress being transformed into a second component of said spiraling wave, said second having a phase difference with said first signal.

3. The method of claim 2 wherein said first and second wave components are perpendicular to each other.

4. The method of claim 2 wherein said first and second signals are 90° out of phase with respect to each other.

5. The method of claim 2 wherein said first and second signals have a different frequency.

6. The method of claim 2 wherein said first and second components have different amplitudes.

7. The method of claim 1 wherein said generating further comprises:
    inducing a stress to an acoustic transducer along an axis;
    amplifying said stress with a cone having an elliptical cross section; and,
    transferring said amplified stress to said acoustic-optic interaction portion of said optical fiber.

8. The method of claim 7 wherein said elliptical cross section has a second axis oriented at 45° with respect to said axis.

9. The method of claim 8 wherein said acoustic transducer is a ring.

10. The method of claim 1 wherein said generating further comprises applying electronic signals to said transducer.

11. The method of claim 10 further comprising monitoring said spiraling and adjusting said electronic signals in response to said monitoring.

12. A transducer, comprising:
    a first section and a second section, said first and second sections each having a polling direction along a first axis; and
    a third section and a fourth section, said third and fourth sections each having a polling direction along a second axis, said third and fourth sections each between said first and second sections, wherein said transducer is configured to receive a first signal at said first section and receive a second signal at said third section, said first signal includes a first component having a first frequency and a second component having a second frequency, and, said second signal includes a first component having said first frequency and a second component having said second frequency, said first component of said first signal having a phase difference with respect to said first component of said second signal, said second component of said first signal having a phase difference with respect to said second component of said second signal to generate a first spiraling wave and a second spiraling wave where said first spiraling wave is orthogonal to said second spiraling wave.

13. The transducer of claim 12 wherein said first axis and said second axis are perpendicular to each other.

14. The transducer of claim 12 wherein said polling direction of said first section points in a direction opposite to said polling direction of said second section.

15. The transducer of claim 12 wherein said polling direction of said third section points in a direction opposite to said polling direction of said fourth section.

16. The transducer of claim 12 wherein said polling direction of said first section and said second section are uni-directional.

17. The transducer of claim 12 wherein said transducer is a transducing ring and said polling direction of said first section and said second section vary radially around said ring.

18. The transducer of claim 12 wherein said first and second signals are 90° out of phase with respect to each other.

19. The transducer of claim 12 wherein said first signal has first frequency and said second signal has a second frequency, said first frequency different than said second frequency.

20. The transducer of claim 12 wherein said phase differences are sufficient to cause said first spiraling wave and said second spiraling wave to each possess clockwise spiraling motion.

21. The transducer of claim 12 wherein said phase differences are sufficient to cause said first spiraling wave and said second spiraling wave to each possess counter-clockwise spiraling motion.

22. The transducer of claim 12 wherein said phase differences are sufficient to cause said first spiraling wave to have clockwise spiraling motion and said second spiraling wave too have counter-clockwise spiraling motion.

23. The transducer of claim 12 wherein said phase differences are sufficient to cause said first spiraling wave to have counter-clockwise spiraling motion and said second spiraling wave too have clockwise spiraling motion.

24. An apparatus, comprising:
   an acousto-optic filter having a horn with an elliptical cross section coupled to a transducer, wherein the acousto-optic filter and transducer cooperate to generate spiraling acoustic waves; and
   an acoustic-optic interaction portion of an optical fiber to interact with the spiraling acoustic waves and create reflected wave components that are orthogonal with respect to wave components that are originally launched onto said interaction portion.

25. The apparatus of claim 24 wherein said transducer is a transducing ring.

26. The apparatus of claim 25 wherein said transducer is a shear mode transducing ring.

* * * * *